US007853385B2

(12) United States Patent
Ly

(10) Patent No.: US 7,853,385 B2
(45) Date of Patent: Dec. 14, 2010

(54) SYSTEMS AND METHODS FOR CONTROLLING TRANSMISSION SHIFTING DURING VEHICLE BRAKING ALONG A DECLINE

(75) Inventor: Tai Joey Ly, Alhambra, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 795 days.

(21) Appl. No.: 11/891,432

(22) Filed: Aug. 10, 2007

(65) Prior Publication Data

US 2009/0043463 A1 Feb. 12, 2009

(51) Int. Cl.
*G06F 7/00* (2006.01)
*G06F 17/00* (2006.01)

(52) U.S. Cl. ............................ 701/51; 180/337; 477/34

(58) Field of Classification Search ................... 701/51, 701/55-56; 180/337; 477/34
See application file for complete search history.

(56) References Cited

U.S. PATENT DOCUMENTS 3,684,066 A 8/1972 Kubo et al.
3,724,293 A 4/1973 Wakamatsu et al.
3,776,048 A 12/1973 Enomoto et al.
3,974,720 A 8/1976 Iijima
4,021,712 A * 5/1977 Ishihara et al. .............. 318/432
4,106,584 A 8/1978 Matsubara
4,355,605 A 10/1982 Robinson et al.
4,829,433 A 5/1989 Nakano et al.
5,005,442 A * 4/1991 Sakakibara et al. ........... 477/41
5,088,348 A 2/1992 Hiramuki
5,097,725 A 3/1992 Sawa
5,188,006 A 2/1993 Goto et al.

(Continued)

FOREIGN PATENT DOCUMENTS

JP 49-51314 * 5/1974

(Continued)

OTHER PUBLICATIONS

Route profile analysis to determine suitability of electric postal delivery vehicles; Walter, C.E.; Kong, M.K.; Mullenhoff, D.J.; Vehicular Technology Conference, 1982. 32nd IEEE; vol. 32; Publication Year: 1982 , pp. 26-39.*

(Continued)

*Primary Examiner*—Cuong H Nguyen
(74) *Attorney, Agent, or Firm*—Dinsmore & Shohl LLP

(57) ABSTRACT

In some embodiments, systems and methods are provided for controlling transmission downshifting of a vehicle. The systems and methods monitor vehicular conditions continuously throughout vehicle travel such that downshifting may occur during braking along a decline and are not influenced by and do not interfere with road grade calculation systems. In one embodiment, a system comprises sensors that monitor vehicular conditions. The sensors transmit signals indicative of vehicular conditions to an electronic controller that processes the signals. The electronic controller generates instructions for downshifting where the processed signals indicate vehicle travel along a decline and when downshifting would not cause exceeding of a maximum revolutions per minute limit. The instructions are transmitted to a transmission system that downshifts the transmission gear position according to the instructions. The electronic controller cancels the instructions for the downshifting when the degree or duration of accelerator pedal depression exceed predefined values.

20 Claims, 3 Drawing Sheets

Pre-conditions to prepare logic:
20 Brake signal on duration / sec.
22 Brake pressure
24 Vehicle speed increase rate during no gas and no brakes
26 Vehicle steering frequency
28 Gas pedal on frequency
30 Brake on pressure
32 Estimate engine rpm of next lower gear
34 Current engine rpm
36 Gear position
38 Vehicle's G Characteristic
EC 10
If all conditions are met:
Downshift 1 gear from current
40 Transmission
Cancel logic if logic:
42 Gas pedal exceed "X" (% or degree)
44 Gas pedal exceed "Y" duration 100 Monitoring Vehicular Conditions During Vehicle Travel
110 Transmitting Signals Indicative of Vehicular Conditions
120 Processing the Transmittal Signals
130 If Processed Signals Indicate Vehicle Travel along a Declining Road Grade and if Processed Signals Comport with Predefined Limits, then Generating Instructions for a Downshifting
140 Transmitting Instructions to Transmission system
150 Downshifting the Transmission Gear Position

U.S. PATENT DOCUMENTS 5,280,432 A 1/1994 Kuwanna et al.
5,282,399 A 2/1994 Sano et al.
5,669,850 A * 9/1997 Dourra et al. ............... 477/108
5,685,801 A * 11/1997 Benford et al. ............. 477/108
5,778,331 A * 7/1998 Leising et al. ................ 701/66
5,803,865 A 9/1998 Harada et al.
5,806,642 A 9/1998 Harada et al.
5,810,694 A * 9/1998 Kamada et al. ............. 477/150
6,095,002 A 8/2000 Tuson et al.
6,212,458 B1 4/2001 Walenty et al.
6,243,637 B1 * 6/2001 Minowa et al. ............... 701/51
6,269,295 B1 7/2001 Gaugush et al.
6,459,981 B1 10/2002 Gimmler et al.
6,470,851 B1 10/2002 DeGroot et al.
6,508,523 B2 1/2003 Yoshino
6,553,306 B2 4/2003 Sayman
6,652,414 B1 11/2003 Banks, III
6,819,995 B2 11/2004 Bellinger
6,944,532 B2 * 9/2005 Bellinger .................... 701/115
6,969,341 B2 11/2005 Hase et al.
6,986,335 B2 1/2006 Sieber et al.
7,000,587 B1 2/2006 Hawkins
7,653,474 B2 * 1/2010 Cawthorne et al. ............ 701/99
2001/0024062 A1 9/2001 Yoshino
2002/0032098 A1 3/2002 Ohtuska
2003/0216847 A1 * 11/2003 Bellinger ..................... 701/51
2004/0087415 A1 5/2004 Vornehm
2004/0100145 A1 5/2004 Holt et al.
2005/0256631 A1 * 11/2005 Cawthorne et al. ............ 701/99
2006/0040791 A1 2/2006 Nakajima et al.
2006/0135315 A1 6/2006 Nakajima et al.
2006/0173599 A1 8/2006 Landes et al.
2009/0043463 A1 * 2/2009 Ly .............................. 701/51
2009/0145673 A1 * 6/2009 Soliman et al. ............ 180/65.1

FOREIGN PATENT DOCUMENTS

JP 62-333036 * 12/1987
JP 7-100005 * 3/1995
JP 10-069779 * 3/1998

OTHER PUBLICATIONS

Speed gradient approach to longitudinal control of heavy-duty vehicles equipped with variable compression brake; Druzhinina, M.; Stefanopoulou, A.G.; Moklegaard, L.; Control Systems Technology, IEEE Transactions on; vol. 10 , Issue: 2; Digital Object Identifier: 10.1109/87.987066; Publication Year: 2002 , pp. 209-220.*

A study on mental model for inferring driver's intention; Takahashi, H.; Kuroda, K.; Decision and Control, 1996., Proceedings of the 35th IEEE; vol. 2; Digital Object Identifier: 10.1109/CDC.1996.572826; Publication Year: 1996 , pp. 1789-1794 vol. 2.*

Nonlinear stabilization of slip in a continuously variable transmission; Klaassen, T.W.G.L. et al.; Control Applications, 2004. Proceedings of the 2004 IEEE International Conference on; vol. 1; Publication Year: 2004 , pp. 338-343 vol. 1.*

Heavy-duty truck control: short inter-vehicle distance following; Lu, X.Y. et al.; American Control Conference, 2004. Proceedings of the 2004; vol. 5; Publication Year: 2004 , pp. 4722-4727 vol. 5.*

A study on automated shifting and shift timing using a driver's mental model; Takahashi, H. et al.; Intelligent Vehicles Symposium, 1996., Proceedings of the 1996 IEEE; Digital Object Identifier: 10.1109/IVS.1996.566395; Publication Year: 1996 , pp. 300-305.*

Road Safety Analysis of Long Downgrade Highway Based on the Property of Vehicle Brakes Heat-Resistant; Xing Enhui et al.; Measuring Technology and Mechatronics Automation (ICMTMA), 2010 International Conference on; vol. 3; Digital Object Identifier: 10.1109/ICMTMA.2010.478; Publication Year: 2010 , pp. 258-261.*

Measuring apparatus and technology for master gears; Ma, Y.; Wang, K.; Wang, L. D.; Technology and Innovation Conference, 2006. ITIC 2006. International; Publication Year: 2006 , pp. 353-357.*

* cited by examiner

SYSTEMS AND METHODS FOR CONTROLLING TRANSMISSION SHIFTING DURING VEHICLE BRAKING ALONG A DECLINE

TECHNICAL FIELD

This invention generally relates to systems and methods for controlling transmission shifting during vehicle braking along a declining road grade. More specifically, embodiments of the present invention generally relate to systems and methods for controlling transmission downshifting of a vehicle, wherein the systems and methods are performed continuously throughout vehicle travel such that downshifting occurs during vehicle braking along the declining road grade.

BACKGROUND

Generally, a vehicle is provided with a system configured to supplement vehicle braking with downshifting of a transmission gear position to assist in slowing down the vehicle during vehicle travel along a declining road grade. This system is configured to calculate road grade and to determine brake application prior to initializing engine braking. In one system, to determine the road grade encountered by a vehicle, vehicle conditions (i.e., vehicle acceleration, accelerator pedal depression, or the like) are monitored and provided to an electronic controller ("EC"). Likewise in the same system, to determine the application of a brake, vehicle conditions such as brake pedal application, absence of accelerator pedal depression, or the like are monitored and provided to the EC. When the monitored conditions indicate a declining road grade and brake pedal application, the EC will initiate downshifting to slow down the vehicle.

Such systems, however, may have problems whereby downshifting is not initiated when brakes are applied during road grade decline. For instance, the EC may discontinue road grade calculation during the application of the brake pedal to prevent erroneous road grade calculations. Repeated brake application may continuously discontinue road calculations and may not provide sufficient time subsequent to each brake application to accurately calculate road grade. Therefore, declining road grade may not be indicated during brake application and downshifting may not be initiated appropriately. Accordingly, there is a need to more accurately initiate downshifting when a vehicle brakes along a decline.

SUMMARY

According to one embodiment, a method of controlling transmission downshifting of a vehicle may comprise monitoring various vehicular conditions during vehicle travel; transmitting signals indicative of the vehicular conditions; processing the transmitted signals; and generating instructions for a downshifting of a transmission gear position of a transmission system of the vehicle. The instructions may be generated when the processed signals indicate vehicle travel along a declining road grade, when braking is being applied by a brake, and when downshifting would not cause a predefined limit of a vehicular condition to be exceeded. The method may further comprise transmitting the instructions for the downshifting to the transmission system and downshifting the transmission gear position according to the instructions. The instructions for the downshifting may be canceled when at least one of one or more accelerator conditions achieve a predefined value.

According to another embodiment, a system for controlling transmission downshifting of a vehicle may comprise one or more sensors configured to monitor vehicular conditions indicative of vehicle travel, wherein the sensors are configured to transmit signals indicative of the vehicular conditions. The system may further comprise an electronic controller configured to process the signals, wherein the electronic controller may be configured to generate instructions for a downshifting of a transmission gear position of a transmission system of the vehicle when the processed signals indicate vehicle travel along a declining road grade and when the processed signals comport with predefined limits at vehicular conditions where downshifting is permitted. In addition, the system may comprise circuitry for transmitting the signals to the electronic controller and for transmitting the instructions to a transmission system of the vehicle, wherein the transmission system may be configured to downshift the transmission gear position according to the instructions. The sensors may be configured to monitor the vehicular conditions continuously throughout vehicle travel such that downshifting occurs during vehicle braking along the declining road grade.

According to yet another embodiment, a vehicle comprising a system for controlling transmission downshifting of a vehicle along a decline is provided. The system is not influenced by and does not interfere with road grade calculation systems of the vehicle.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 1:
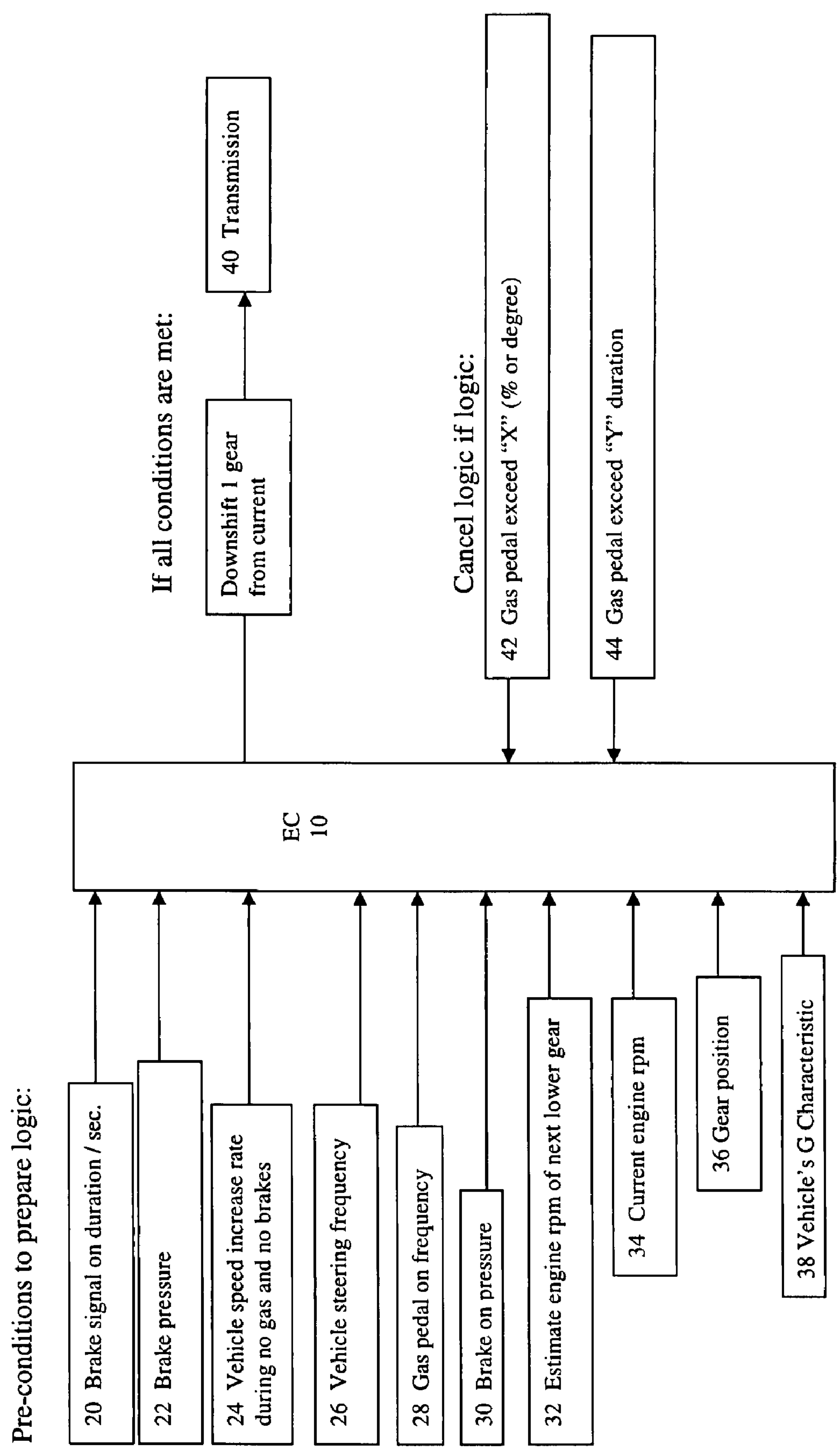
FIG. 1 is a logic diagram depicting an example of a method of controlling transmission downshifting during vehicle braking along a decline, in accordance with one embodiment of the present invention.
Figure 3:
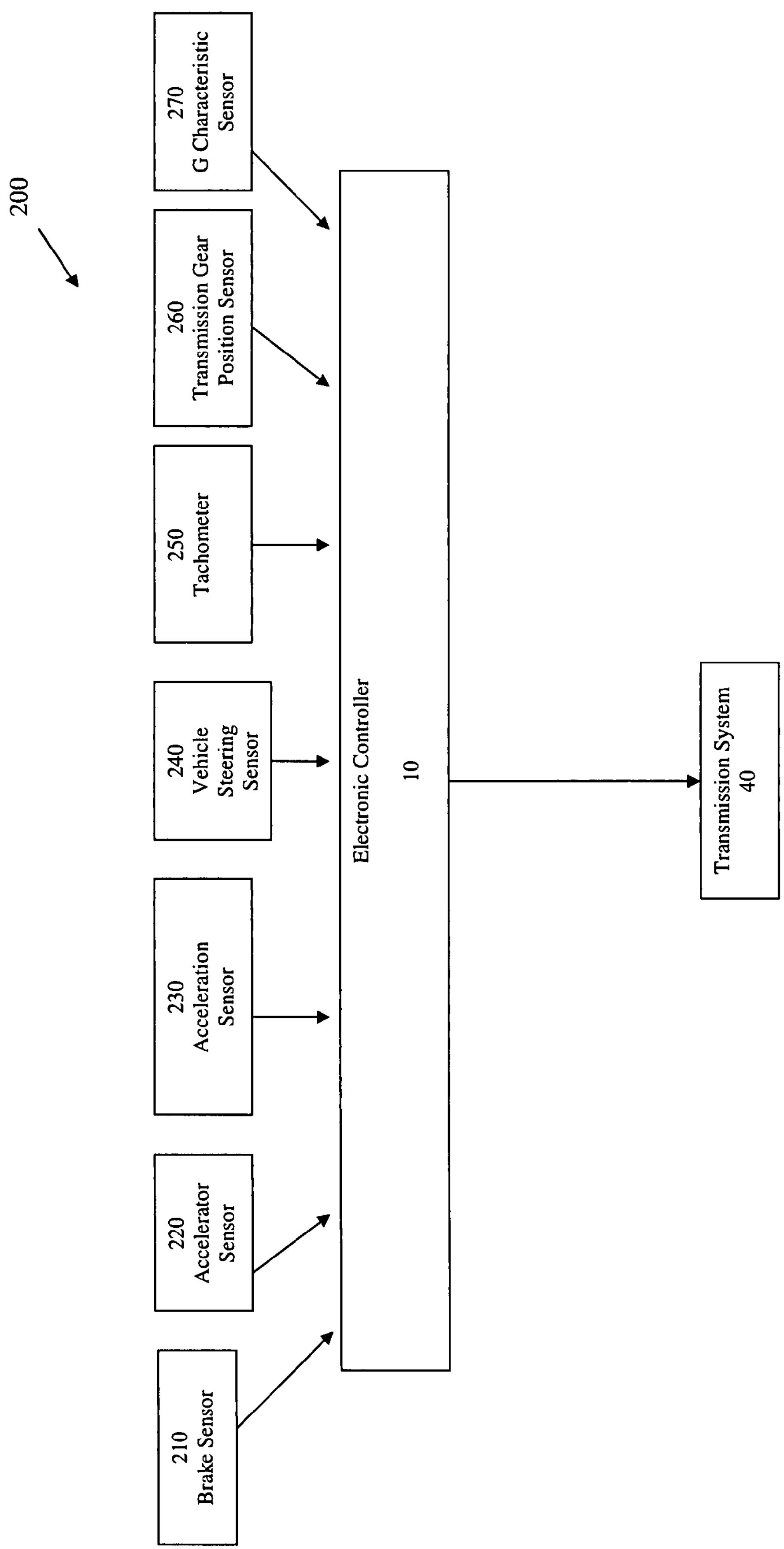
FIG. 3 is a diagram depicting an example of a system for controlling transmission downshifting during vehicle braking along a decline, in accordance with one embodiment of the present invention.

Referring to the figures in detail, FIG. 3 illustrates a diagram of one embodiment of a system 200 for controlling transmission downshifting of a vehicle. As depicted in FIG. 3, the system 200 may comprise one or more sensors for monitoring vehicular conditions during vehicle travel. According to one embodiment, the sensors of the system 200 may comprise: a tachometer 250, a transmission gear position sensor 260, a brake sensor 210, an accelerator sensor 220, an acceleration sensor 230, a vehicle steering sensor 240, and a vehicle G characteristic sensor 270. The sensors may be configured to monitor any various vehicular conditions, such as those present in FIG. 1.

The brake sensor 210 may be configured to monitor vehicular conditions such as, but not limited to, duration of brake pedal depression 20, degree of brake pedal depression 30, frequency of brake pedal depression, and brake pressure 30. The accelerator sensor 220 may be configured to monitor vehicular conditions such as, but not limited to, frequency of accelerator pedal depression 28, degree of accelerator pedal depression 42, and duration of accelerator pedal depression 44. The acceleration sensor 230 may be configured to monitor vehicular conditions such as, but not limited to, increases in speed of the vehicle without depressions of the brake pedal and the accelerator pedal 24. The vehicle steering sensor 240 may be configured to monitor vehicular conditions such as, but not limited to, frequency of steering wheel adjustment 26, duration of steering wheel adjustment, and degree of steering wheel adjustment. The tachometer 250 may be configured to monitor vehicular conditions such as, but not limited to, engine rotational velocity 34. The transmission gear position sensor 260 may be configured to monitor vehicular conditions such as, but not limited to, the transmission gear position 36 and the estimation of the engine rotational velocity at the next lower transmission gear position 32. The vehicle G characteristic sensor 270 may be configured to monitor vehicular conditions such as, but not limited to, the G characteristic of the vehicle 38.

According to another embodiment, the sensors of the system 200 may comprise: a tachometer 250, a transmission gear position sensor 260, an accelerator sensor 220, and at least one of: a brake sensor 210, an acceleration sensor 230, a vehicle steering sensor 240, and a vehicle G characteristic sensor 270. It is contemplated that the system 200 may comprise other or additional sensors configured to monitor various other vehicular conditions. The sensors may comprise any of a variety of sensing, detection, or monitoring devices, and/or related circuitry, that provide the appropriate signals for indicating the desired vehicle parameter.

As further depicted in FIG. 3, the sensors of this embodiment can transmit signals indicative of the vehicular conditions to an electronic controller ("EC") 10 of the system 200. The EC may comprise an electronic control unit so that the EC 10 then can process the signals to determine the type of vehicle travel occurring and whether a downshifting of the transmission gear position of the transmission system of a vehicle is appropriate. For exemplary purposes only, signals such as 10 degrees of brake pedal depression, 5 accelerator pedal depressions, 5 steering wheel adjustments, and 2 seconds duration of brake pedal depression may indicate vehicle travel along a declining road grade and that downshifting may be appropriate. It is contemplated that various other values and/or the monitoring of other or additional vehicular conditions may indicate types of vehicle travel and appropriateness of downshifting.

After processing the signals, the EC 10 of this embodiment generates instructions for the downshifting of the transmission gear position where the processed signals indicate vehicle travel along a declining road grade and where the processed signals comport with predefined limits of vehicular conditions that permit downshifting. These predefined limits of vehicular conditions represent relationships between each transmission gear position of the transmission system and partially overlapping allowable ranges of engine revolutions per minute ("RPM") of the engine rotational velocity. The predefined limits are defined such that the monitored engine rotational velocity RPM does not exceed upper limits of the range of RPM associated with a transmission gear position lower than the monitored transmission gear position. These predefined limits may be specific to various models of vehicles.

In some such embodiments, the instructions for the downshifting can be canceled where at least one of one or more accelerator applications of the vehicular conditions achieve a predefined value. The one or more accelerator applications that cancel the instructions for the downshifting can comprise the degree of accelerator pedal depression and the duration of accelerator pedal depression. By way of example only, the predefined value for the degree of accelerator pedal depression sufficient to cancel the instructions for downshifting may be between 1 degree and 84 degrees, and, more particularly, can be about 10 degrees. Further, by way of example only, the predefined value of the duration of accelerator pedal depression sufficient to cancel the instructions for downshifting may be between 0.1 seconds and 10 seconds, and, more particularly, can be about 2 seconds. In accordance with one embodiment, the instructions for the downshifting are canceled when the degree of accelerator pedal depression is between 1 degree and 84 degrees or the duration of accelerator pedal depression is between 0.1 seconds and 10 seconds. It is contemplated that other predefined values for the degree and/or duration of accelerator pedal depression may be established. Such predefined values may vary according to different vehicle models.

The system 200 further comprises circuitry for transmitting signals from the sensors to the EC 10 and, further, for transmitting instructions, activating or cancelling the downshifting, from the EC 10 to the transmission system 40 of the vehicle. The transmission system 40 then downshifts the transmission gear position according to the instructions generated by the EC 10.

The sensors of the system 200 can monitor vehicular conditions continuously throughout vehicle travel such that the downshifting occurs during vehicle braking along the declining road grade. Further, the system 200 for controlling transmission downshifting is not influenced by, and does not interfere with, road grade calculation systems of the vehicle. Rather, other vehicular conditions are monitored and downshifting is determined based upon these conditions, such that actual road grade is not needed.

Figure 2:
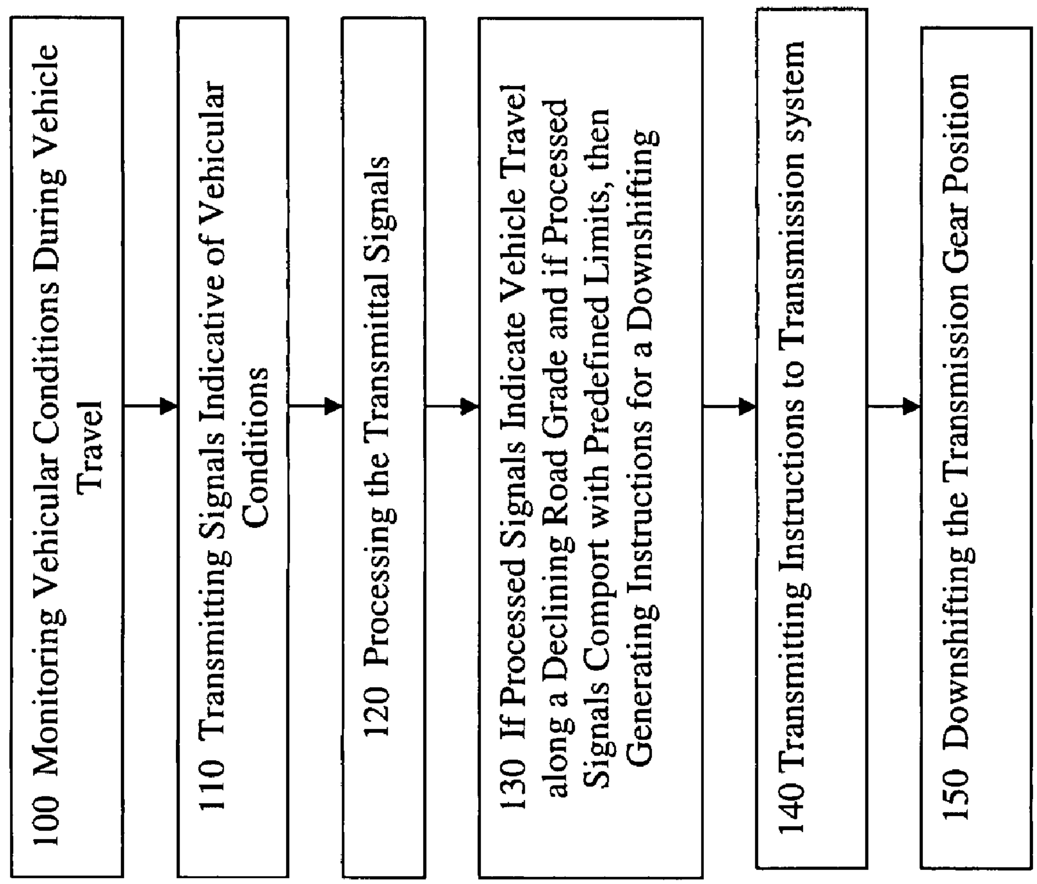
FIG. 2 is a flowchart depicting an example of a method of controlling transmission downshifting during vehicle braking along a decline, in accordance with one embodiment of the present invention.

According to another embodiment, the present invention relates to a method of controlling transmission downshifting of a vehicle. FIG. 2 illustrates a flowchart depicting an embodiment of such a method. As shown in FIG. 2, the method comprises monitoring various vehicular conditions during vehicle travel (block 100). According to one embodiment, the vehicular conditions, shown in FIG. 1, comprise: engine rotational velocity 34, transmission gear position 36, duration of brake pedal depression 20, degree of brake pedal depression 30, brake pressure 22, increases in speed of the vehicle without depressions of the brake pedal and the accelerator pedal 24, frequency of accelerator pedal depression 28, G characteristic of the vehicle 38, frequency of steering wheel adjustment 26, estimation of engine rotational velocity at next lower transmission gear position 32, degree of accelerator pedal depression 42, and duration of accelerator pedal depression 44.

According to another embodiment, the vehicular conditions comprise: engine rotational velocity 34, transmission gear position 36, at least one of degree of accelerator pedal depression 42 and duration of accelerator pedal depression 44, and at least one of: duration of brake pedal depression 20, degree of brake pedal depression 30, brake pressure 22, increases in speed of the vehicle without depressions of the brake pedal and the acceleration pedal 24, frequency of accelerator pedal depression 28, G characteristic of the vehicle 38, frequency of steering wheel adjustment 26, and estimation of engine rotational velocity at next lower transmission gear position 32.

As shown in FIG. 2, the method further comprises transmitting signals indicative of the vehicular conditions (block 110) and processing the transmitted signals (block 120). Thereafter, the method comprises generating instructions for a downshifting of a transmission gear position of a transmission system of the vehicle where the processed signals indicate vehicle travel along a declining road grade and where the processed signals comport with predetermined limits of vehicular conditions that permit downshifting (block 130). Thereafter, the method comprises transmitting instructions for the downshifting to a transmission system of the vehicle (block 140) and downshifting the transmission gear position to a lower transmission gear position (block 150). The instructions for downshifting are canceled where at least one of one or more accelerator pedal applications of the vehicular conditions achieve a predefined value, as described herein.

The method of controlling transmission downshifting is performed continuously throughout vehicle operation such that the method may control transmission downshifting shifting during vehicle braking along the declining road grade. Further, the method is not influenced by, and does not interfere with, road grade calculation methods performed by the vehicle.

According to yet another embodiment, the present invention generally relates to a vehicle comprising a system for controlling transmission downshifting of the vehicle. According to one embodiment, the system comprises one or more sensors for transmitting signals indicative of vehicular conditions. An EC of the system processes the transmitted signals and generates instructions for a downshifting of the transmission gear position where the signals indicate vehicle travel along a declining road grade and where the processed signals comport with predefined limits of vehicular conditions that permit downshifting.

The system further comprises circuitry for transmitting signals from the sensors to the EC and, further, for transmitting instructions from the EC to the transmission system of the vehicle. The transmission system then downshifts the transmission gear position according to the instructions generated by the EC. Any variety of signals and mechanisms can be used to carry out this downshifting. For example, the EC or other controller can send a signal to an electronic transmission controller that causes an electrical shift solenoid to become activated to carry out the downshift. The vehicle to which an embodiment of the system is applied may be one of any various models of vehicles.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. Other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It should be understood that the EC may perform such calculation/processing via programs, firmware, fuzzy logic, neural networks or other electronic algorithms now known or hereafter developed for controlling downshifting during vehicle travel along a decline. The algorithms illustrated may be embodied as a program, code, or instructions exECted by a computer, controller, or other processing circuit.

It is noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

What is claimed is:

1. A method of controlling transmission downshifting of a vehicle, the method comprising:

monitoring various vehicular conditions during vehicle travel;

transmitting signals indicative of the vehicular conditions;

processing the transmitted signals;

generating instructions for a downshifting of a transmission gear position of a transmission system of the vehicle when the processed signals indicate vehicle travel along a declining road grade, when braking is being applied by a brake, and when downshifting would not cause a predefined limit of a vehicular condition to be exceeded;

transmitting the instructions for the downshifting to the transmission system; and downshifting the transmission gear position according to the instructions, wherein the instructions for the downshifting are canceled when at least one of one or more accelerator conditions achieve a predefined value.

2. The method of claim 1, wherein the method of controlling transmission downshifting is not influenced by and does not interfere with any road grade calculation systems of the vehicle.

3. The method of claim 1, wherein the monitoring of the vehicular conditions is performed continuously throughout vehicle travel such that downshifting occurs during vehicle braking along the declining road grade.

4. The method of claim 1, wherein the vehicular conditions comprise:

engine rotational velocity;

transmission gear position;

at least one of degree of accelerator pedal depression and duration of accelerator pedal depression; and at least one of:

a. duration of brake pedal depression;

b. degree of brake pedal depression;

c. brake pressure;

d. increase in speed of the vehicle without depressions of brake pedal and acceleration pedal;

e. frequency of accelerator pedal depression;

f. G characteristic of vehicle;

g. frequency of steering wheel adjustments; and h. estimation of engine rotational velocity at next lower transmission gear position.

5. The method of claim 4, wherein the one or more accelerator conditions that cancel the instructions for the downshifting are the degree of accelerator pedal depression and the duration of accelerator pedal depression.

6. The method of claim 5, wherein the electronic controller is configured such that the instructions for the downshifting are canceled when the degree of accelerator pedal depression is between 1 degree and 84 degrees or the duration of accelerator pedal depression is between 0.1 seconds and 10 seconds.

7. A system for controlling transmission downshifting of a vehicle, the system comprising:

one or more sensors configured to monitor vehicular conditions indicative of vehicle travel, wherein the sensors are configured to transmit signals indicative of the vehicular conditions;

an electronic controller configured to process the signals, wherein the electronic controller is configured to generate instructions for a downshifting of a transmission gear position of a transmission system of the vehicle when the processed signals indicate vehicle travel along a declining road grade and when the processed signals comport with predefined limits at vehicular conditions where downshifting is permitted; and circuitry for transmitting the signals to the electronic controller and for transmitting the instructions to a transmission system of the vehicle, wherein the transmission system is configured to downshift the transmission gear position according to the instructions, wherein the sensors are configured to monitor the vehicular conditions continuously throughout vehicle travel such that downshifting occurs during vehicle braking along the declining road grade.

8. The system of claim 7, wherein the electronic controller comprises an electronic control unit.

9. The system of claim 7, wherein the system is not influenced by and does not interfere with any road grade calculation systems of the vehicle.

10. The system of claim 7, wherein the sensors of the system comprise:

a tachometer;

a transmission gear position sensor;

an accelerator sensor; and at least one of:

a. a brake sensor;

b. an acceleration sensor;

c. a vehicle G characteristic sensor; and d. a steering wheel sensor.

11. The system of claim 10, wherein:

a. the tachometer is configured to monitor the vehicular condition of engine rotational velocity;

b. the transmission gear position sensor is configured to monitor the vehicular conditions of transmission gear position and estimation of engine rotational velocity at next lower transmission gear position;

c. the brake sensor is configured to monitor the vehicular conditions of degree of brake pedal depression, duration of brake pedal depression, and brake pressure;

d. the accelerator sensor is configured to monitor the vehicular conditions of degree of accelerator pedal depression, duration of accelerator pedal depression, and frequency of accelerator pedal depression;

e. the acceleration sensor is configured to monitor the vehicular condition of increases in speed of the vehicle without depressions of brake pedal or accelerator pedal;

f. the vehicle G characteristic sensor is configured to monitor the vehicular condition of a G characteristic of the vehicle; and g. the vehicle steering sensor is configured to monitor the vehicular condition of frequency of steering wheel adjustment.

12. The system of claim 7, wherein the electronic controller is configured such that the instructions for the downshifting are canceled when at least one of one or more accelerator conditions achieve a predefined value.

13. The system of claim 12, wherein the one or more accelerator conditions that cancel the instructions for the downshifting are the degree of accelerator pedal depression and the duration of accelerator pedal depression.

14. The system of claim 13, wherein the predefined value for the degree of accelerator depression sufficient to cancel the instructions for downshifting is between 1 degree and 84 degrees.

15. The system of claim 13, wherein the predefined value for the duration of accelerator depression sufficient to cancel the instructions for downshifting is between 0.1 seconds and 10 seconds.

16. The system of claim 7, wherein the predefined limits of vehicular conditions represent relationships between each transmission gear position of the transmission system and partially overlapping ranges of engine revolutions per minute of engine rotational velocity.

17. The system of claim 16, wherein the predefined limits of vehicular conditions that permit downshifting are defined such that downshifting is not permitted if engine revolutions per minute of the monitored engine rotational velocity would exceed upper limits of the range of engine revolutions per minute associated with the transmission gear position lower than the current transmission gear position.

18. A vehicle comprising a system for controlling transmission downshifting of a vehicle, wherein the system comprises:

one or more sensors configured to monitor vehicular conditions indicative of vehicle travel, wherein the sensors are configured to transmit signals indicative of the vehicular conditions;

an electronic controller configured to process the signals, wherein the electronic controller is configured to generate instructions for a downshifting of a transmission gear position of a transmission system of the vehicle when the processed signals indicate vehicle travel along a declining road grade and when the processed signals comport with predefined limits of vehicular conditions that permit downshifting; and circuitry configured to transmit the signals to the electronic controller and to transmit the instructions to a transmission system of the vehicle, such that the transmission system downshifts the transmission gear position according to the instructions, wherein the sensors are configured to monitor the vehicular conditions continuously throughout vehicle travel such that downshifting occurs during vehicle braking along the declining road grade, wherein the system is not influenced by and does not interfere with any road grade calculation systems of the vehicle.

19. The vehicle of claim 18, wherein the sensors of the system comprise:

a tachometer;

a transmission gear position sensor;

an accelerator sensor; and at least one of:

a. a brake sensor;

b. an acceleration sensor;

c. a vehicle G characteristic sensor; and d. a steering wheel sensor.

20. The vehicle of claim 18, wherein the electronic controller is configured such that the instructions for the downshifting are canceled when the degree of accelerator pedal depression is between 1 degree and 84 degrees or the duration of accelerator pedal depression is between 0.1 seconds and 10 seconds.

* * * * *